United States Patent
Gershenson et al.

(10) Patent No.: US 6,255,620 B1
(45) Date of Patent: Jul. 3, 2001

(54) FILTER BAG ASSEMBLY LINE AND METHOD

(75) Inventors: Moshe Gershenson, Mohegan Lake, NY (US); Walter Booth, East Hanover, NJ (US)

(73) Assignee: H-Tech, Inc., Wilmington, DE (US)

(*) Notice: Subject to any disclaimer, the term of this patent is extended or adjusted under 35 U.S.C. 154(b) by 0 days.

(21) Appl. No.: 09/301,931

(22) Filed: Apr. 29, 1999

Related U.S. Application Data

(60) Provisional application No. 60/083,679, filed on Apr. 30, 1998.

(51) Int. Cl.[7] .............................. B23K 26/38; B32B 31/16
(52) U.S. Cl. ..................................... 219/121.67; 156/73.1; 219/121.72
(58) Field of Search .................................. 228/1.1, 110.1, 228/160; 219/121.67, 121.72; 156/73.1, 272.8

(56) References Cited

U.S. PATENT DOCUMENTS

| | | | |
|---|---|---|---|
| 4,490,203 | * | 12/1984 | Bose . |
| 4,545,833 | * | 10/1985 | Tafara . |
| 5,215,609 | * | 6/1993 | Sanders . |
| 5,788,791 | * | 8/1998 | Grewell ................................ 156/73.1 |
| 5,881,535 | * | 3/1999 | Gliniecki et al. . |
| 6,010,548 | * | 1/2000 | Burkhead et al. . |

FOREIGN PATENT DOCUMENTS

| | | | |
|---|---|---|---|
| 2221422 | * | 2/1990 | (GB) . |
| 59-29114 | * | 2/1984 | (JP) . |
| 11-59631 | * | 3/1999 | (JP) . |

* cited by examiner

*Primary Examiner*—Geoffrey S. Evans
(74) *Attorney, Agent, or Firm*—Selitto, Behr & Kim

(57) ABSTRACT

A filter bag assembly line first forms a tube from a filter media, the tube being cut to twice the length of a finished filter bag and being open on opposite ends. The tube is then vibration welded across its width, intermediate the ends, to form the bottoms of two filter bags in an end-to-end configuration. The adjoined filter bags are separated by a laser cutting machine and the separated bags then passed to an accumulation station. An operator removes a filter bag from the accumulation station and places the filter bag along with a corresponding bag ring into a welding station, which welds the filter bag and the ring together.

24 Claims, 8 Drawing Sheets

FILTER BAG ASSEMBLY LINE AND METHOD

CROSS REFERENCE TO RELATED APPLICATIONS

This is a §111 (a) application relating to U.S. application Ser. No. 60/083,679 filed Apr. 30, 1998.

FIELD OF THE INVENTION

The present invention relates to a filter bag assembly line and method, and, more particularly, to the portion of the assembly line and the assembly process from a station that forms the bag bottom through a station that attaches a support ring to the bag.

BACKGROUND OF THE INVENTION

Existing methods of welding filter bag bottoms are generally slow and not readily adaptable to an automated assembly line or result in relatively poor quality welds, which is undesirable. One method of welding bag bottoms, the hot air nozzle method, uses two pre-cut bag halves that are passed along a hot air welder. An operator inserts the hot air nozzle into the bag at a starting point; activates the hot air nozzle machine, softening each bag bottom half; places the semi-molten surfaces between a pair of driven nip rolls to seal the halves together; stops the machine once one side of the bag is welded; flips the bag over; and repeats the process for the other side of the bag. The bag has to be removed from the nozzle at a precise point, so that the nozzle will not damage the end of the bag. This process is slow, as it is entirely dependent upon the speed of the operator working the hot air nozzle machine, and results in poor quality welds having improperly aligned bag halves, loose fibers along the bottom edges of the bag due to the required pre-cutting, or welds of varying margins.

A second method for welding bag bottoms is the hot plate-type method. In this method, a heated tong-type plate, shaped to match the shape of the bottom of the bag, is inserted between the two layers of the bag bottom. The plate is withdrawn after the inner surfaces of the two halves have been slightly softened, and the halves are then pressed together to bond. This method is difficult to control, since the width of the bag must precisely match the width of the heated plate, which does not permit even slight variation of the bag width. Using an under-sized (i.e., narrow) bag will create damaged molten edges, while using an over-sized (i.e., wide) bag will create channels of unwelded sections along the bag bottom. Since controlling the bag width to close tolerances is difficult, this method is impractical to use.

A third method of welding bag bottoms is the ultrasonic plunge welding method. A major disadvantage to this method is that each side of the bag has to be welded separately, since ultrasonic welding is not capable of welding components longer than twelve inches. The quality of the weld depends upon uniformity of the thickness and density of a given material, which varies widely with filtration media felts. Additionally, ultrasonic welding results in welds of a lesser strength than other methods, mainly due to the fact that energy is transferred from the outside of the bag to the interface of the two layers of the bag bottom, which requires excessive melting of the outer surface in order to achieve a strong weld at the interface of the two layers. Ultrasonic welding also has a tendency to cause embrittlement of the weld due to the high level of energy required in the welding process.

In order to be utilized in an assembly line process, the method used to weld filter bag bottoms must be fast and result in high-quality welds. The methods of the prior art are generally slow and result in poor quality welds because the various factors contributing to each weld (for instance, the temperature achieved during the weld, the weld margin, and the force applied to bond the softened surfaces together) cannot be precisely controlled. There is therefore a need in the art for a method to weld filter bag bottoms that allows precise control over the quality of the weld and that is fast enough to be adapted for use in an assembly line environment.

SUMMARY OF THE INVENTION

The present invention involves a method for welding filter bag bottoms that is well-suited for use in a filter bag assembly line. By running two pre-formed filter tubes (each filter tube is the length of two completed bags, mated in an end-to-end configuration) side-by-side on two conveyor belts through a vibration welder and then through a laser cutter, a high-quality welded bag bottom is achieved. Using a vibration welder, the present invention can simultaneously weld four bag bottoms of a truncated design in approximately 10 seconds, whereas the various prior art methods would require twelve welds to make four bag bottoms of a truncated design, and would take between 60 and 120 seconds to complete.

By using a laser cutter in conjunction with the vibration welder, the bag bottoms do not need to be pre-cut in order to be welded. The laser cutter separates the joined bags, and removes excess material along the truncated bag bottom. Using a laser cutter provides a glazed smooth edge, which is superior in appearance to a mechanically sheared cut, and leaves no loose fibers, which is an important feature for filters.

The quality of the finished bag bottoms manufactured in accordance with the present invention is superior to that achieved using the prior art methods due to the degree of control possible through the use of the vibration welder and the laser cutter. The weld quality can be precisely controlled by using a machined vibration welding tool and by presetting the parameters of the weld (e.g., the force used, the frequency amplitude of the movement of the welding tool, and the melt-down parameters). Utilizing a non-contact laser is beneficial in that there is no need for heavy-duty cutting equipment and the maintenance associated with cutting equipment (i.e., no sharpening of knives or dies).

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE INVENTION

Figure 1:
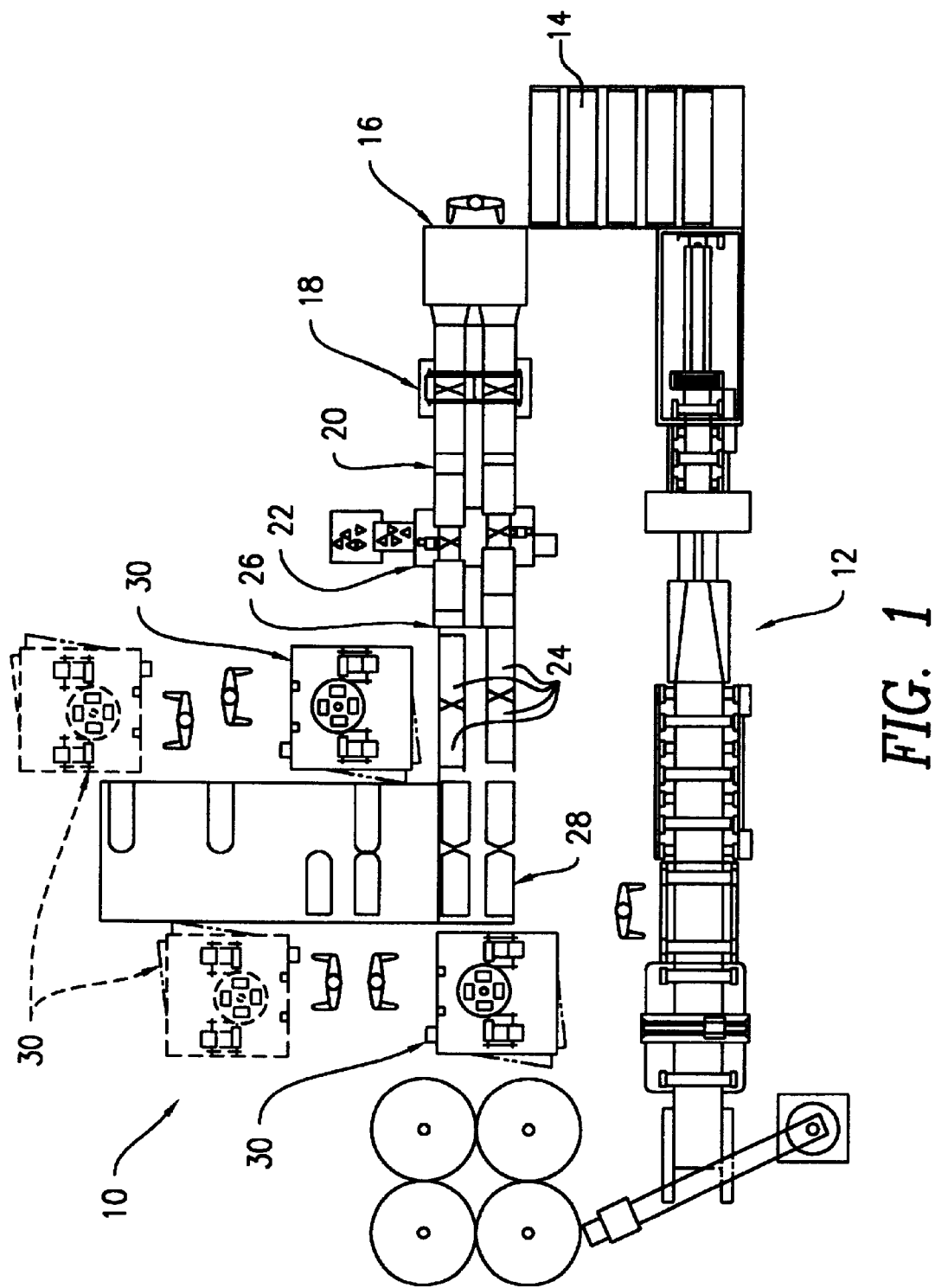
FIG. 1 is a top plan view of the overall assembly line.

FIG. 1 shows the entire filter bag assembly line 10. A front end section 12 consists of various conventional components arranged such that the front end section 12 begins with a single layer filtration media and ends with the media formed into filter tubes 14. Each filter tube 14 is a folded-over piece of filtration media, hot-air seam welded along one edge to form a tube, and cut to twice the length of a finished filter bag.

The following is an overview of the progress of the filter tubes 14 through the remainder of the assembly line 10. Each of the stations of the assembly line 10 will be discussed in greater detail below. After the filter tubes 14 are cut to the proper length, the tubes 14 are placed by an operator into an operator load station 16. From the load station 16, the tubes 14 pass into a vibration welding station 18, where each tube 14 is welded midway between its ends, thereby forming two filter bags per tube 14 mated in a bottom-to-bottom configuration. A material handling section 20 removes the tubes 14 from the vibration welding station 18 and passes the tubes 14 into a laser cutting station 22, where each tube 14 is cut into two filter bags 24.

A material handling section 26 removes the bags 24 from the laser cutting station 22 and passes the bags 24 to an accumulation station 28. An operator removes a bag 24 from the accumulation station 28 and inserts it, along with a filter bag ring (not shown in FIG. 1), into the ring welder station 30, which welds a ring onto each bag 24, thereby completing the bag 24.

The configuration of the stations shown in FIG. 1 is one of several possible configurations for the overall layout of the assembly line 10. In particular, four ring welder stations 30 are shown in FIG. 1, with the two ring welder stations 30 shown in phantom being locations for optional additional ring welder stations 30. In addition, the accumulation station 28 could be extended such that more than the four ring welder stations 30 shown in FIG. 1 could be part of the assembly line 10. It is also possible to configure the assembly line 10 such that it is primarily in a straight line, as opposed to the U-shaped configuration shown in FIG. 1. In this alternate configuration, the tubes 14 could be transported from the front end section 12 to the load station 16 by a conveyor belt (not shown).

The remainder of the discussion will be in the singular, referring to the progress of one filter tube 14 through the assembly line 10. The assembly line 10 is constructed to process two filter tubes 14 simultaneously in a side-by-side fashion on separate conveyors. The discussion of the progress of one tube 14 is equally applicable to the other tube 14 traveling along an adjacent conveyor.

Figure 2:
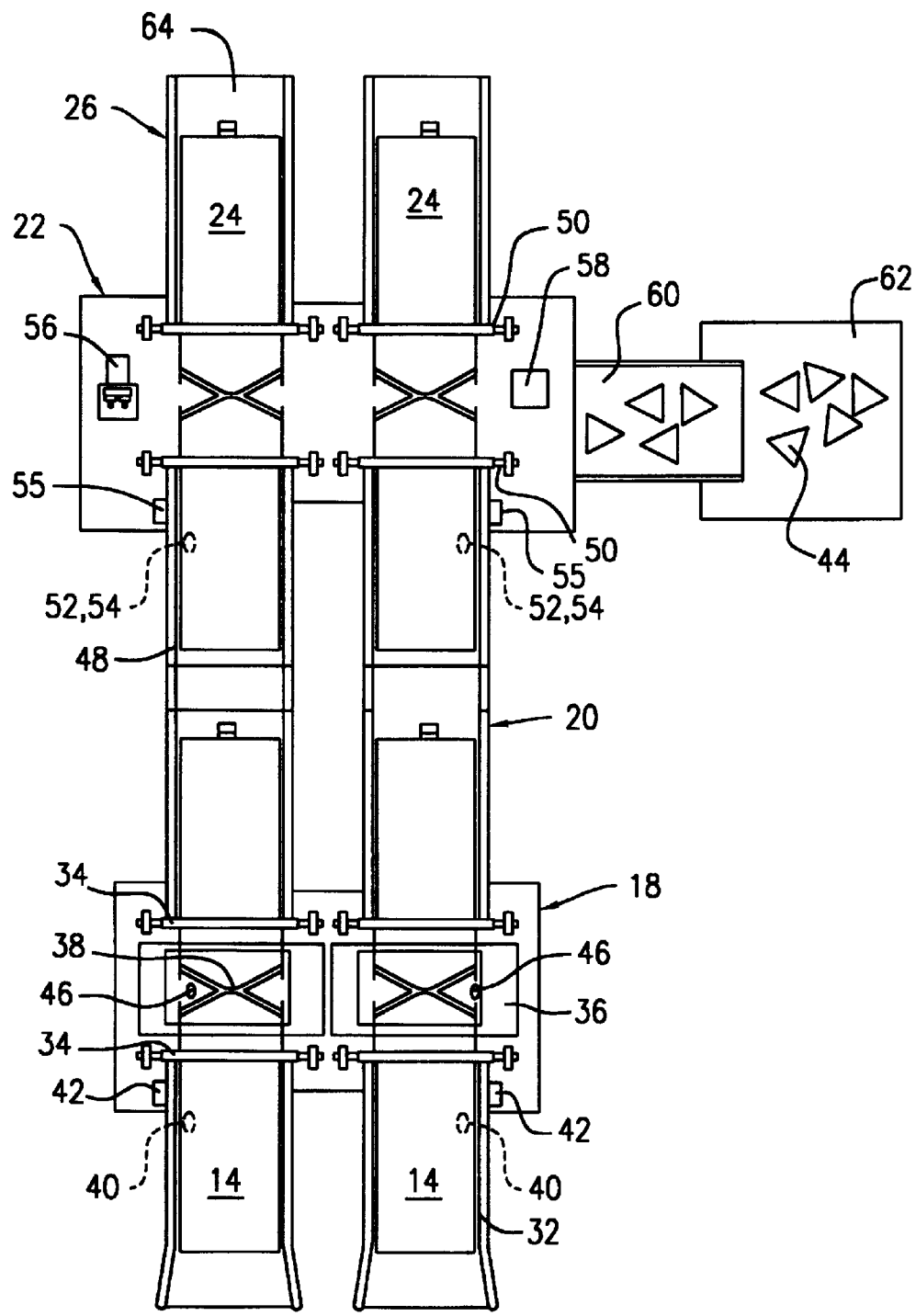
FIG. 2 is an enlarged top plan view of the vibration welding and laser cutting stations shown in FIG. 1.
Figure 3:
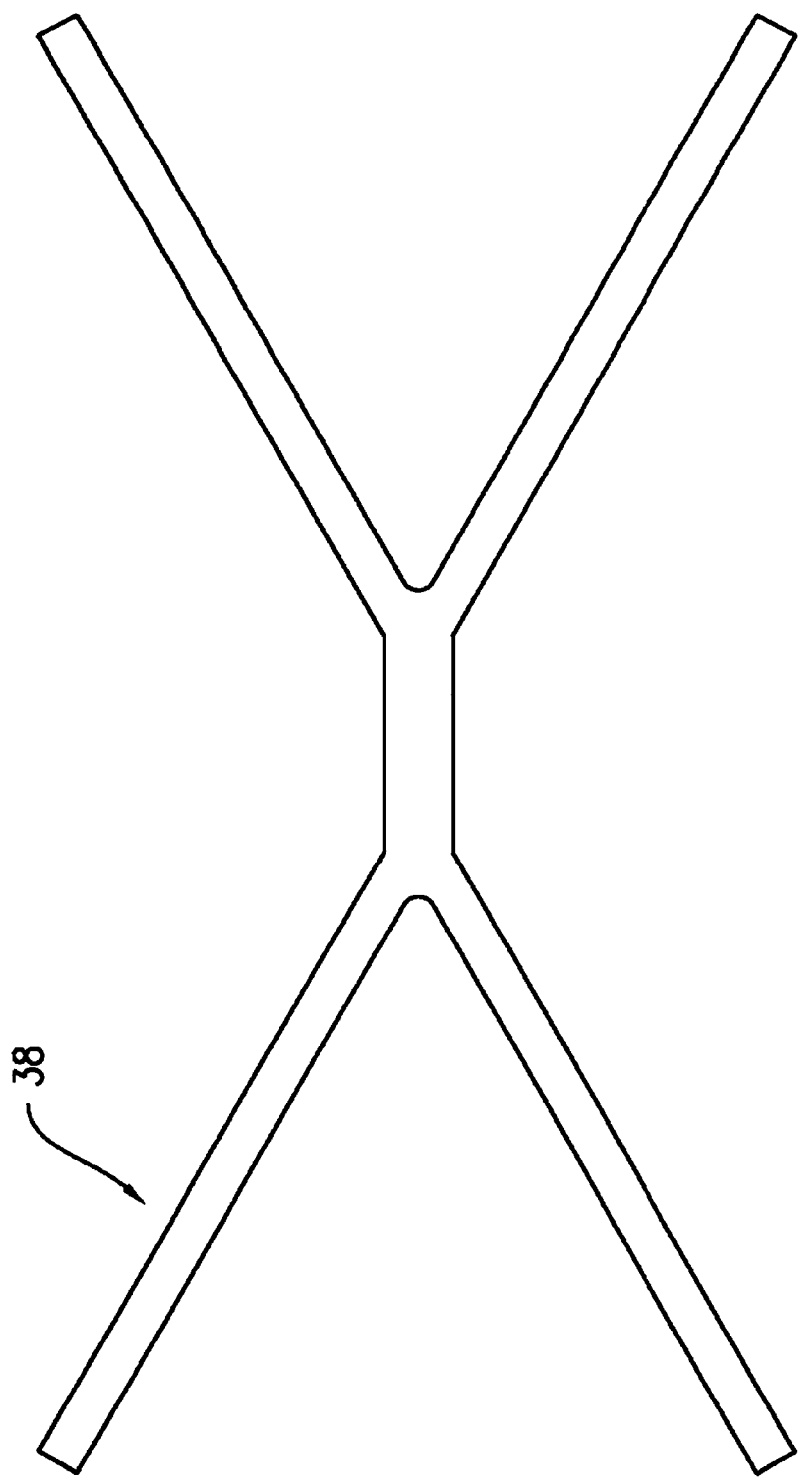
FIG. 3 is a top plan view of the welding tool used in the vibration welder shown in FIG. 2.

Referring now to FIG. 2, the filter tube 14 passes from the load station 16 (not shown in FIG. 2) onto a slider bed conveyor 32. A pair of driven pinch rollers 34 grip above and below the tube 14, passing the tube 14 into the vibration welding station 18, which consists of a vibration welder 36 having a welding tool 38 which is shaped to conform to two truncated bag bottoms in a bottom-to-bottom, i.e., end-to-end, configuration (see FIG. 3). A photodetector 40 is located on the conveyor 32 before the vibration welder 36 and detects the leading edge of the tube 14. When the leading edge of the tube 14 is detected, a servo motor 42 is activated. The servo motor 42 is used to properly center the tube 14 inside the vibration welder 36 by stopping the conveyor 32 when the pre-set length has been counted off. The servo motor 42 can be set for different length bags, without requiring any additional changes to the assembly line 10. Once the servo motor 42 has centered the tube 14, the vibration welder 36 is activated.

Figure 4:
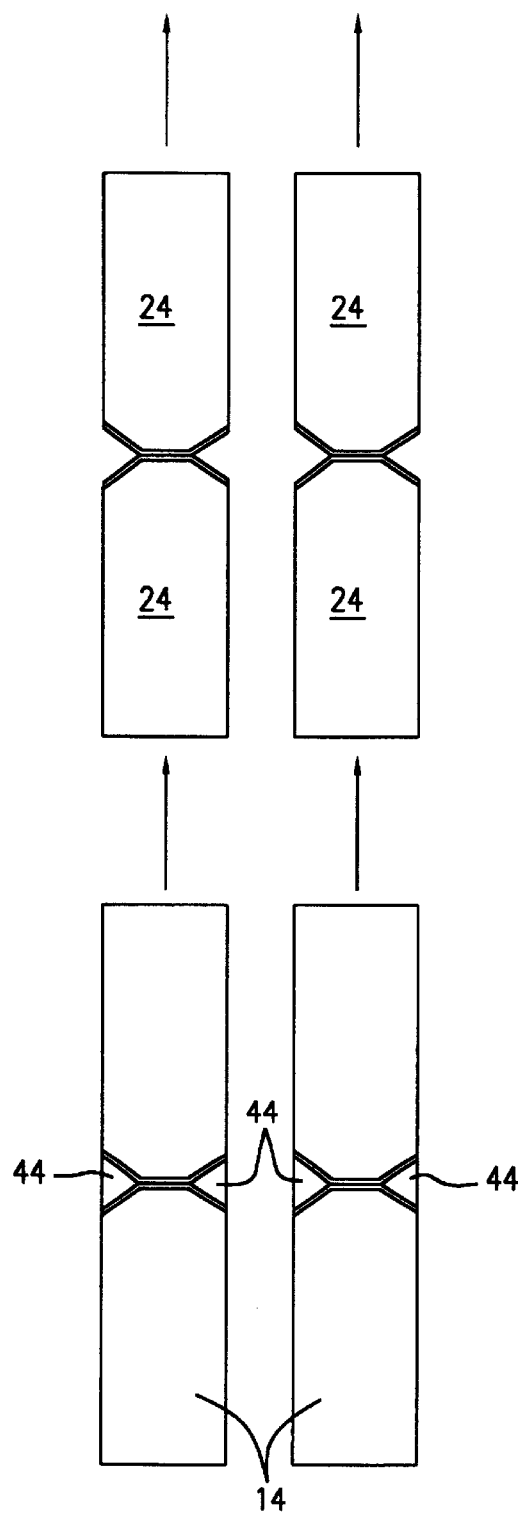
FIG. 4 is a top plan view of the state of the bags as they pass through the vibration welding and laser cutting stations shown in FIG. 2.

The vibration welder 36 (such as Sonics & Materials Inc.'s model number EH4800) welds the center of the tube 14 with the welding tool 38, forming the truncated bottom shape of two bags 24 joined together in a bottom-to-bottom configuration (see FIG. 4). As a result of the weld, the tube 14 has two triangular excess portions 44 (see FIG. 4) which join the two welded bags 24 together. Since the weld is formed at the joinder of two bags 24 and is approximately 0.625 inches wide, the welded tube 14 must be precisely cut along the center of the weld, else the bags 24 will be defective along the bottom edges thereof.

To accurately position the welded tube 14 in the laser cutting station 22, a line (not shown) is drawn onto the bottom side of each of the excess portions 44 by an inkjet printer 46 (such as Dell's JetMarker printer) while the welded tube 14 is in the vibration welding station 18. After the lines are drawn, the pinch rollers 34 are re-started, and the welded tube 14 is pulled out of the vibration welder 36 and onto a slider bed conveyor 48 of the material handling section 20. A pair of driven pinch rollers 50 passes the welded tube 14 from the conveyor 48 into the laser cutting station 22.

A reflector 52 is located above the conveyor 48 before the laser cutting station 22, and a photoelectric cell 54 is positioned below the reflector 52. The reflector 52 and the photoelectric cell 54 are used in conjunction with the lines drawn on the bottom side of the excess portions 44 to stop the movement of the welded tube 14 through the laser cutting station 22, thereby centering the welded tube 14 beneath a laser cutter 56. While light from the reflector 52 passes through the passing welded tube 14, the pinch rollers 50 are in operation, drawing the welded tube 14 through the laser cutting station 22. When a line drawn on one of the excess portions 44 is positioned between the reflector 52 and the photoelectric cell 54, the photoelectric cell 54 detects the dark line and activates a servo motor 55, which counts off the proper length of the bag relative to the line, to thereby center the welded tube 14 beneath the laser cutter 56.

As an alternative to drawing the line on the underside of the excess portions 44, the inkjet printer 46 could be replaced with a hole punch, which would punch a hole through the excess portions 44. The hole would be detected by the reflector 52 and the photoelectric cell 54 in a similar manner as the line, and the operation of this portion of the assembly line 10 would remain unchanged.

Figure 5:
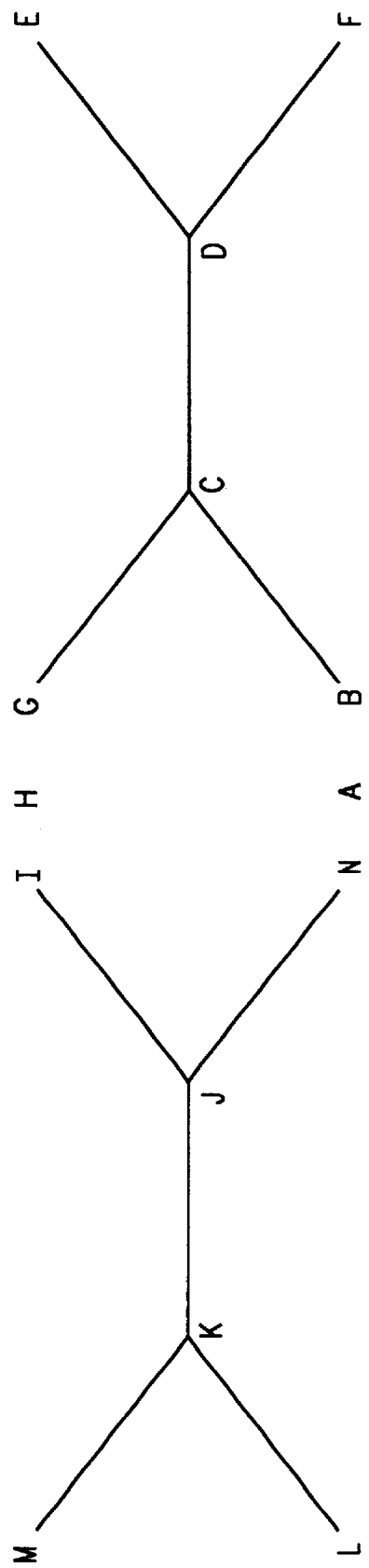
FIG. 5 is a diagrammatic view of the path of the laser cutter shown in FIG. 2.

The laser cutter 56 (such as Jamieson Manufacturing Co. Inc.'s model number LC2) is a standard programmable X-Y table laser, which cuts the welded tube 14 into two separate bags 24 along the welded bag bottom. The laser cutter 56 cuts the tubes 14 on both of the conveyor belts during each pass of the laser. The cutting pattern is shown in FIG. 5. The laser cutter 56 moves between the lettered positions as follows: A - B - C - D - E - F - D - C - G - H - I - J - K - L - M - K - J - N - A. The triangular excess portions 44 (see FIG. 4) are trimmed away, leaving a smoothly cut, truncated bag bottom.

After cutting, each bag 24 is left with one opening, a mouth, located at an end of the bag 24 opposite the welded bottom. The triangular excess portions 44 are removed from the laser cutter 56 by a trimmed pieces removal device 58, onto a take-away conveyor 60, and into a collection bin 62. By locating the collection bin 62 away from the laser cutter 56, the excess portions 44 can be removed and disposed of without interrupting the assembly line 10. After the laser cutting is completed, the pinch rollers 50 are re-started, and the bags 24 are removed from the laser cutting station 22 via a slider bed conveyor 64 of the material handling section 26 and are transported to the accumulation station 28.

Figure 6:
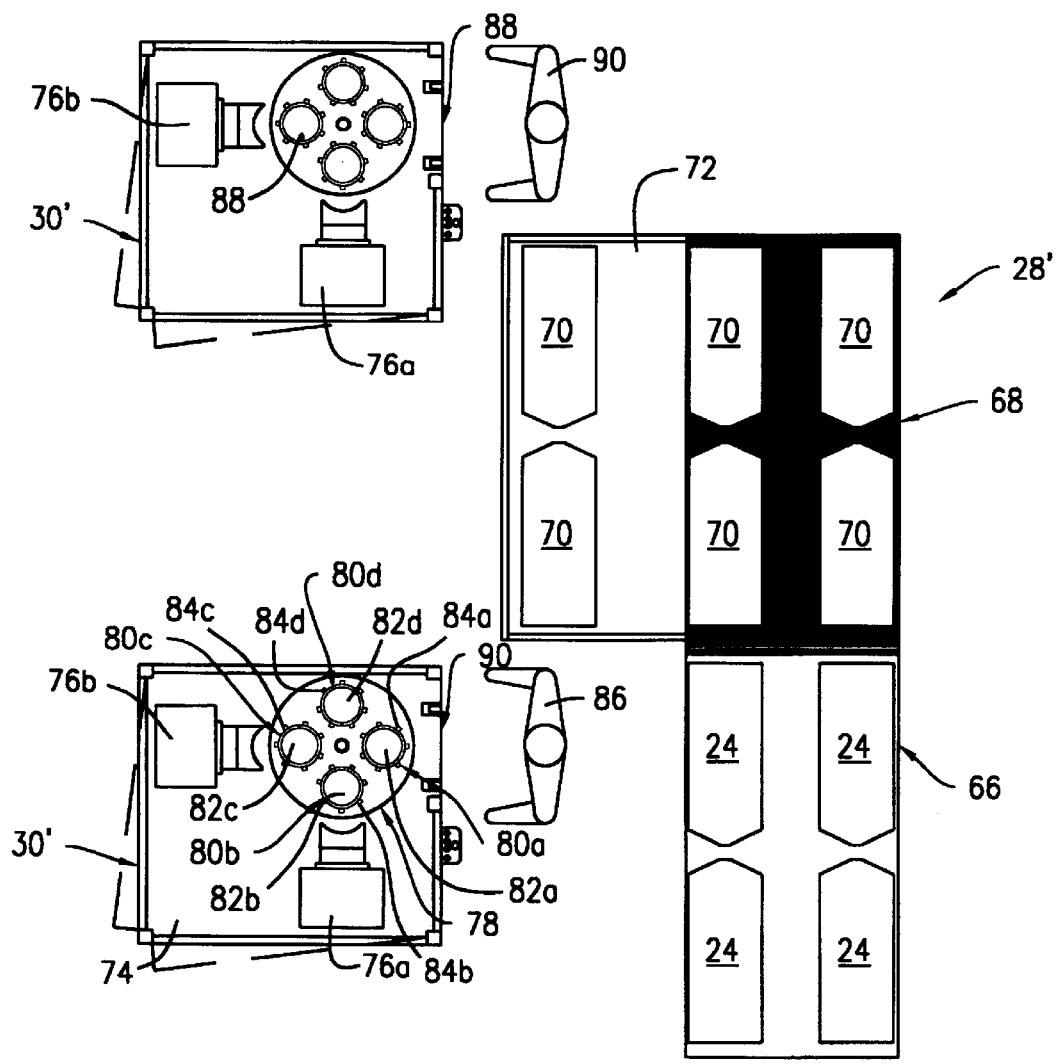
FIG. 6 is an enlarged top plan view of a modified configuration of the accumulation station and the ring welder stations shown in FIG. 1.

FIG. 6 shows alternative configurations for the accumulation station 28 and the ring welder stations 30 than those depicted in FIG. 1. The key difference between the alternative configurations is that in FIG. 1, the welding machines of the ring welder stations 30 are shown at 180° spacing, whereas in FIG. 6, the welding machines are shown at 90° spacing. Accordingly, the alternative stations shown in FIG. 6 have been designated with prime reference numerals (i.e., accumulation station 28' and ring welder stations 30'). Referring now to FIG. 6, a stacker infeed conveyor 66 takes the bags 24 from the material handling section 26 (see FIG. 1) and passes the bags 24 to a stacking device 68, which stacks the bags 24 into eight inch high stacks 70. A stacker accumulator conveyor 72 removes the completed stacks 70 from the stacking device 68 and places the stacks 70 in a location convenient for the operators of the ring welder stations 30' to be able to access the stacks 70.

Each ring welder station 30' has a machine base 74, on which two sonic welders 76a, 76b (such as Sonics & Materials, Inc.'s model number 1096S) are mounted at 90° spacing. An indexing table 78 is rotatably positioned on the machine base 74 and has four positions 80a–d. The indexing table 78 also has four mandrels 82a–d, each mandrel 82 having an associated set of alignment fixtures 84. Each mandrel 82 is constructed such that it, along with its associated alignment fixtures 84, can be rotated in place, independently of the indexing table 78. The mandrels 82a–d are located at positions 80a–d, with each mandrel 82 capable of being indexed by the indexing table 78 through each of the positions 80a–d.

In operation, each of the ring welder stations 30' functions as follows. An operator 86 places a ring 88 onto the mandrel 82a located at position 80a, in front of an access opening 90. The operator 86 then takes a bag 24 (not shown) from one of the stacks 70 and places the bag 24 upside down onto the mandrel 82a, such that the mouth of the bag 24 surrounds the ring 88. The indexing table 78 is rotated 90° clockwise, so that the mandrel 82a carrying the bag 24 and ring 88 is at position 80b, in front of sonic welder 76a, which welds the bag 24 to the ring 88 along a 60° arc. The mandrel 82a at position 80b is rotated in place by 60°, and the sonic welder 76a then welds the bag 24 to the ring 88 along a second 60° arc. The mandrel 82a at position 80b is again rotated in place by 60°, and the sonic welder 76a welds the bag 24 to the ring 88 along a third 60° arc. The result of the alternating welding and rotating phases being that the sonic welder 76a welds the first 180° of the bag 24 to the ring 88 in three successive 60° arcs.

The indexing table 78 is next rotated 90° clockwise such that the mandrel 82a carrying the partially welded bag 24 and ring 88 is at position 80c, in front of sonic welder 76b. The operation of the sonic welder 76b is the same as the sonic welder 76a, with the exception being that the mandrel 82a carrying the bag 24 and ring 88 is rotated in place by 60° first, then welded in a 60° arc, thereby welding the remaining 180° of the bag 24 to the ring 88 in 60° increments. The sequence of welding and rotating is purposely out of synch between the sonic welders 76a, 76b so that both welders are never firing at the same time. This alternative welding eliminates any potential interference problems between the two welders 76a, 76b and also minimizes the peak power draw.

Once the welding by the sonic welder 76b is complete, the indexing table 78 is rotated another 90° clockwise such that the mandrel 82a carrying the completely welded bag 24 and ring 88 is at position 80d. The indexing table 78 stays in this position until the welding of two other bags at positions 80b and 80c is completed. The indexing table is then rotated a final 90° such that the mandrel 82a carrying the completely welded bag 24 and ring 88 is at position 80a, where the completely welded bag 24 and ring 88 can be unloaded by the operator 86 through the access opening 90. The entire cycle is then repeated. Since two bags are being welded at each ring welder station 30' during a single complete cycle of the ring welder station 30', operator load and unload speed should not adversely affect the speed of the assembly line 10. Additional ring welder stations 30' (shown in phantom in FIG. 1) could be added to the assembly line 10 to increase productivity and/or to relieve congestion at the stacker accumulation conveyor 72.

Figure 7:
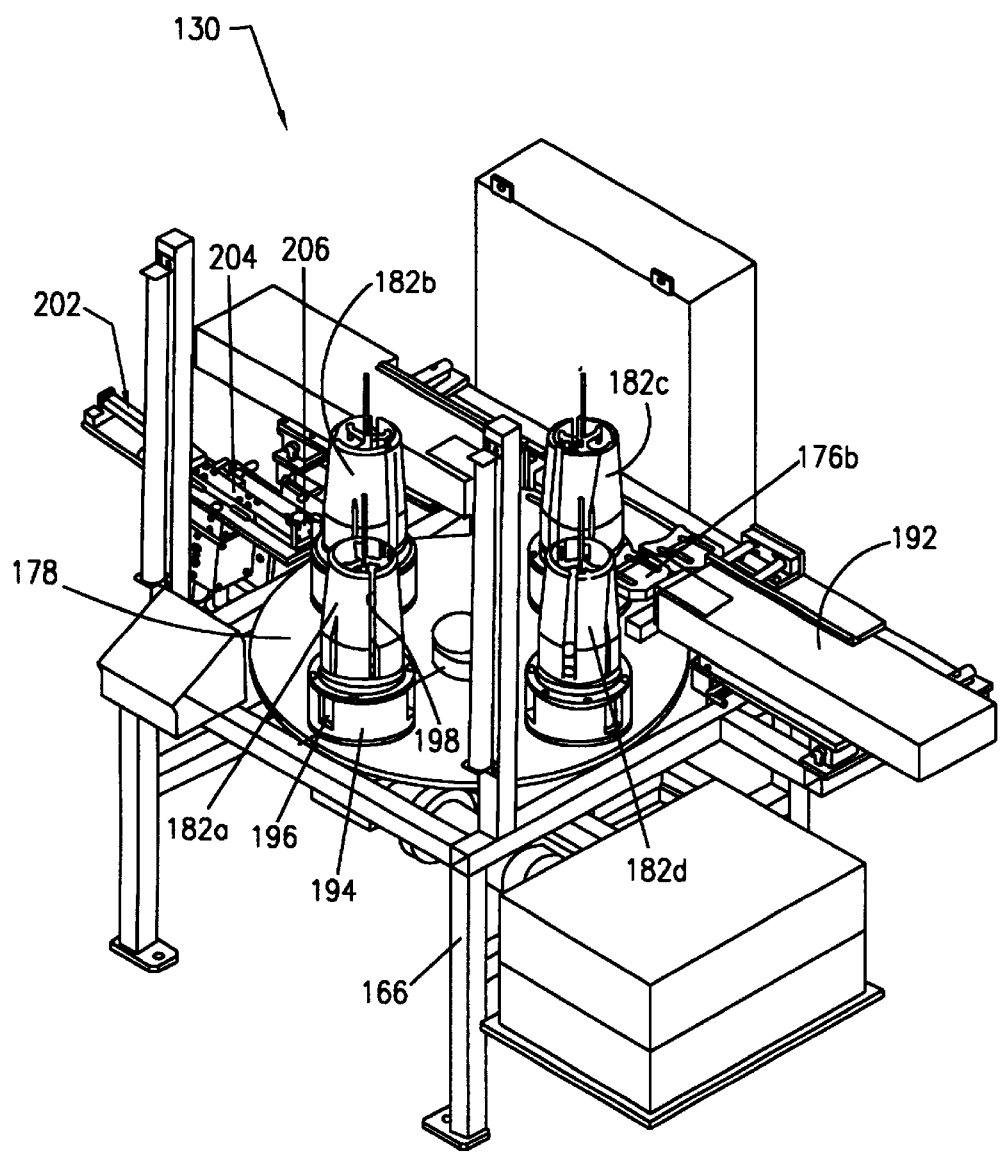
FIG. 7 is a perspective view of an alternate configuration of the ring welder station shown in FIG. 6.
Figure 8:
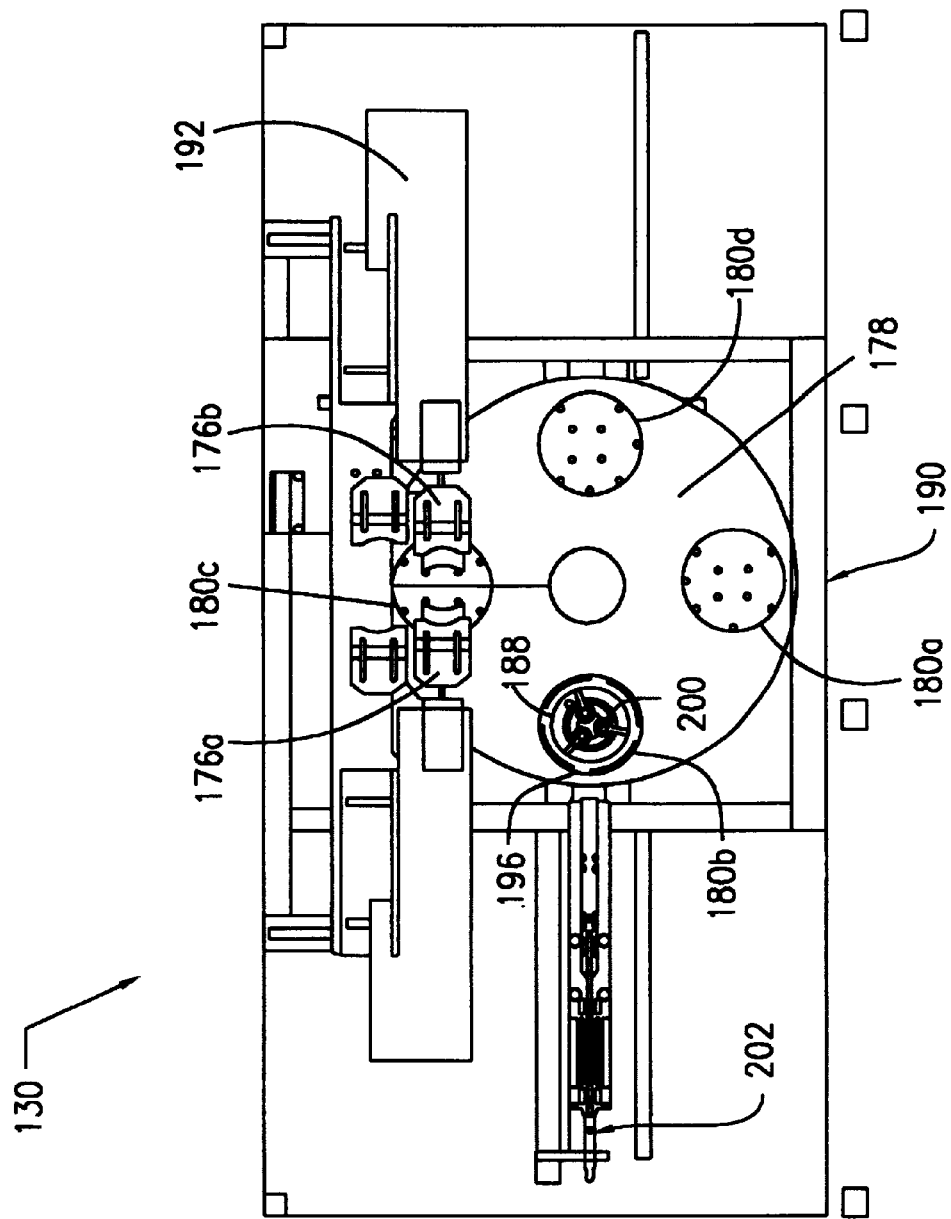
FIG. 8 is a top view of the ring welder station shown in FIG. 7.

Another exemplary embodiment of a ring welder station constructed in accordance with the present invention is illustrated in FIGS. 7 and 8. Elements illustrated in FIGS. 7 and 8 which correspond to the elements described above with respect to FIG. 6 have been designated by corresponding reference numerals increased by one hundred.

Each ring welder station 130 has a machine base 166, on which a movable carriage 192 is mounted. The carriage 192 holds two sonic welders 176a, 176b (such as Sonics & Materials, Inc.'s model number 1096S), which are mounted at 180° spacing, such that both sonic welders 176a, 176b are movable at the same time. An indexing table 178 is rotatably positioned on the machine base 166 and has four positions 180a–d. The indexing table 178 also has four mandrels 182a–d, each mandrel 182 being positioned on a mandrel base 194 having an access hole 196 located near the indexing table 178 (see FIG. 7). Each mandrel 182 has an associated set of alignment slots 198. Each mandrel base 194 is constructed such that it can be rotated in place, independently of the indexing table 178. The mandrels 182a–d are located at positions 180a–d, with each mandrel 182 capable of being indexed by the indexing table 178 through each of the positions 180a–d.

In operation, each of the ring welder stations 130 functions as follows. An operator (not shown in FIGS. 7 and 8) places a ring 188 onto the mandrel 182a located at position 180a, in front of an access opening 190. The ring 188 is shown and described in two co-pending applications which are commonly owned by the assignee herein, U.S. Ser. No. 09/097,547 and U.S. Ser. No. 09/246,052, the disclosures of which are incorporated herein by reference. As shown in FIG. 8, the lifting rings 200 of the ring 188 are placed through the alignment slots 198 of the mandrel 182a.

The operator then takes a bag 124 (not shown) from one of the stacks 70 and places the bag 124 upside down onto the mandrel 182a, such that the mouth of the bag 124 surrounds the ring 188. The indexing table 178 is rotated 90° clockwise, so that the mandrel 182a carrying the bag 124 and ring 188 is at position 180b, in front of a stamp mechanism 202 having an arm 204 and a stamp 206. Once the mandrel 182a is at position 180b, the arm 204 extends towards the mandrel base 194, with the stamp 206 passing through the access hole 196. The arm 204 then raises the stamp 206 up and the arm 204 retracts, such that the stamp 206 contacts the inner surface of the ring 188. The stamp 206 imprints the inner surface of the ring 188 through temperature and pressure, and can include catalog information, bag information, and the manufacturing date. After stamping, the arm 204 extends again, removing the stamp 206 from the inner surface of the ring 188. The arm 204 is then lowered and retracts, removing the stamp 206 from the mandrel base 194 through the access hole 196.

The indexing table 178 is next rotated 90° clockwise such that the mandrel 182a carrying the bag 124 and the ring 188 is at position 180c, which is the welding position. The carriage 192 is moved towards the indexing table 178, such that the sonic welders 176a, 176b are positioned on opposite sides of the mandrel 182a. The sonic welders 176a, 176b then move towards the mandrel 182a, into their respective welding positions (see FIG. 8). The sonic welders 176a, 176b are sized and shaped such that each welds a 60° arc of the bag 124 to the ring 188.

In operation, once in the proper welding position, the sonic welders 176a, 176b fire simultaneously, thereby welding first opposing 60° arcs of the bag 124 to the ring 188. The sonic welders 176a, 176b are then retracted from around the mandrel 182a, such that the mandrel 182a can be rotated in place by 60°. The sonic welders 176a, 176b then return to their welding positions and weld second opposing 60° arcs of the bag 124 to the ring 188. The sonic welders 176a, 176b are again retracted from around the mandrel 182a, such that the mandrel 182a can rotate in place by another 60°. The sonic welders 176a, 176b return to their welding positions and weld third opposing 60° arcs of the bag 124 to the ring 188. The result of the alternating welding and rotating cycles is that each of the sonic welders 176a, 176b welds 180° of the bag 124 to the ring 188 in three successive 60° arcs, thereby completely welding the bag 124 to the ring 188. After the welding cycle is completed, the sonic welders 176a, 176b retract from around the mandrel 182a, and the carriage 192 is moved away from the indexing table 178.

The indexing table 178 is next rotated another 90° clockwise such that the mandrel 182a carrying the completely welded bag 124 and ring 188 is at position 180d, where the completely welded bag 124 and ring 188 can be unloaded by the operator. While the mandrel 182a is at position 180d, another ring 188 and bag 124 are loaded onto the mandrel 182b, which is at position 180a, in front of the access opening 190. The entire cycle is then repeated.

Various modifications can be made to the ring welder station 130 to increase the productivity of the assembly line 10. For instance, a robot arm could be utilized to remove the completely welded bag 124 and ring 188 from position 180c. It is also possible to automatically load the rings 188 onto the mandrels 182 at position 180d by using a stacking device. It would still be necessary for the operator to manually load a bag 124 onto the ring 188 at position 180a. Employing these two additional automated features would increase the overall productivity of the assembly line 10 by approximately 200%.

It will be understood that the embodiments described herein are merely exemplary and that a person skilled in the art may make many variations and modifications without departing from the spirit and scope of the present invention. For example, in the ring welder station 130, it is possible to add a third sonic welder and adjust the spacing between the sonic welders to 120° apart. Accordingly, a bag 124 could be welded to a ring 188 faster, since only one in-place rotation of the bag 124 and ring 188 would be necessary. All such variations and modifications are intended to be included within the scope of the invention as defined in the appended claims.

What is claimed is:

1. A method for forming a plurality of filter bags from a tube or filter media open on opposite ends, comprising the steps of:
   vibration welding across the width of the tube intermediate the ends, thereby forming the bottoms of two filter bags in an end-to-end configuration; and
   laser cutting across the welded portion of the tube, thereby separating the two filter bags and at least partially melting the filter media while laser cutting to eliminate loose fibers.

2. The method of claim 1, wherein
   the vibration welding step includes using a vibration welding tool sized and shaped to form a truncated bag bottom weld, which results in excess joining material between the two filter bags; and
   the laser cutting step includes trimming away the excess joining material from each filter bag bottom to form a pair of truncated filter bag bottoms.

3. The method of claim 1 wherein the vibration welding step includes marking the tube intermediate the ends, and wherein the laser cutting step includes detecting the mark on the tube and positioning the tube for laser cutting.

4. The method of claim 3, wherein the marking step includes providing an indicia on the tube.

5. The method of claim 3, wherein the detecting step includes placing a light source above a photo-detector such that the mark on the tube is detected when the tube passes between the light source and the photo-detector, and wherein the positioning step includes activating a servo motor for advancing the tube.

6. A method for forming a plurality of filter bags from a tube of filter media open on opposite ends, comprising the steps of:
   vibration welding across the width of the tube intermediate the ends, thereby forming the bottoms of two filter bags in an end-to-end configuration;
   laser cutting across the welded portion of the tube, thereby separating the two filter bags; and
   welding the filter bag to a corresponding bag ring, the welding step including
   using a first welding machine and a second welding machine which are spaced apart 180° relative to each other;
   welding first opposing 60° arcs of the filter bag to the ring;
   rotating the filter bag and ring by 60°;
   welding second opposing 60° arcs of the filter bag to the ring;
   rotating the filter bag and ring by 60°; and
   welding third opposing 60° arcs of the filter bag to the ring, thereby completely welding the filter bag to the ring.

7. The method of claim 6, further comprising the step of stamping identifying information on the bag ring prior to welding.

8. A method for forming a plurality of filter bags from a tube of filter media open on opposite ends, comprising the steps of:
   vibration welding across the width of the tube intermediate the ends, thereby forming the bottoms of two filter bags in an end-to-end configuration;
   laser cutting across the welded portion of the tube, thereby separating the two filter bags; and welding the filter bag to a corresponding bag ring, the welding step including
using three welding machines which are spaced apart 120° relative to each other;
welding first 60° arcs of the filter bag to the ring;
rotating the filter bag and ring by 60°; and
welding second 60° arcs of the filter bag to the ring, thereby completely welding the filter bag to the ring.

9. The method of claim 8, further comprising the step of stamping identifying information on the bag ring prior to welding.

10. A filter bag assembly line for forming a plurality of filter bags from a tube of filter media open on opposite ends, comprising:
vibration welding means for vibration welding across the width of the tube intermediate the ends, thereby forming the bottoms of two filter bags in an end-to-end configuration; and
laser cutting means for laser cutting across the welded portion of the tube, thereby separating said two filter bags and at least partially melting the filter media at the cut to eliminate loose fibers.

11. A filter bag assembly line according to claim 10, wherein said vibration welding means includes a vibration welding machine having a welding tool sized and shaped to form a truncated bag bottom weld, and wherein said laser cutting means includes a laser cutting machine which trims away a triangular portion of each filter bag bottom to form a pair of truncated filter bag bottoms.

12. A filter bag assembly line according to claim 10, further comprising
marking means for marking the tube intermediate the ends;
detecting means for detecting the mark on the tube, said detecting means located proximate to said laser cutting means; and
positioning means for positioning the tube within said laser cutting means, said positioning means operating in response to said detecting means.

13. A filter bag assembly line according to claim 12, wherein said marking means is located adjacent to said vibration welding means, said marking means operating after said vibration welding means.

14. A filter bag assembly line according to claim 12, wherein said marking means includes an inkjet printer which prints an indicia on the tube.

15. A filter bag assembly line according to claim 12, wherein said detecting means includes a light source and a photo-detector, said light source being positioned above said photo-detector such that the tube passes in between said light source and said photo-detector.

16. A filter bag assembly line according to claim 12, wherein said positioning means includes a servo motor which advances the tube by a pre-set length once the mark on the tube has been detected by said detecting means, thereby positioning the tube within said laser cutting means.

17. A filter bag assembly line for forming a plurality of filter bags from a tube of filter media open on opposite ends, comprising:
vibration welding means for vibration welding across the width of the tube intermediate the ends, thereby forming the bottoms of two filter bags in an end-to-end configuration; and
laser cutting means for laser cutting across the welded portion of the tube, thereby separating said two filter bags,
said assembly line including two parallel tracks, each track carrying a tube, said laser cutting means cutting the tubes on both tracks during one pass of the laser cutting means.

18. A filter bag assembly line for forming a plurality of filter bags from a tube of filter media open on opposite ends, comprising:
vibration welding means for vibration welding across the width of the tube intermediate the ends, thereby forming the bottoms of two filter bags in an end-to-end configuration;
laser cutting means for laser cutting across the welded portion of the tube, thereby separating said two filter bags; and
welding means for welding said filter bag to a corresponding bag ring.

19. A filter bag assembly line according to claim 18, wherein said welding means includes two welding machines which are spaced apart 180° relative to each other.

20. A filter bag assembly line according to claim 19, wherein each welding machine includes a sonic welding tool sized and shaped so as to weld a 60° arc of said filter bag to said ring.

21. A filter bag assembly line according to claim 18, wherein said welding means includes three welding machines which are spaced apart 120° relative to each other.

22. A filter bag assembly line according to claim 21, wherein each welding machine includes a sonic welding tool sized and shaped so as to weld a 60° arc of said filter bag to said ring.

23. A filter bag assembly line according to claim 18, further comprising stamping means for stamping identifying information on said bag ring.

24. A filter bag assembly line according to claim 23, wherein said stamping means includes a retractable arm having a stamp capable of stamping an inner surface of said bag ring.

* * * * *